INVENTOR.
BY Arrigo Cegnar
Stevens, Davis, Miller & Mosher
ATTORNEYS

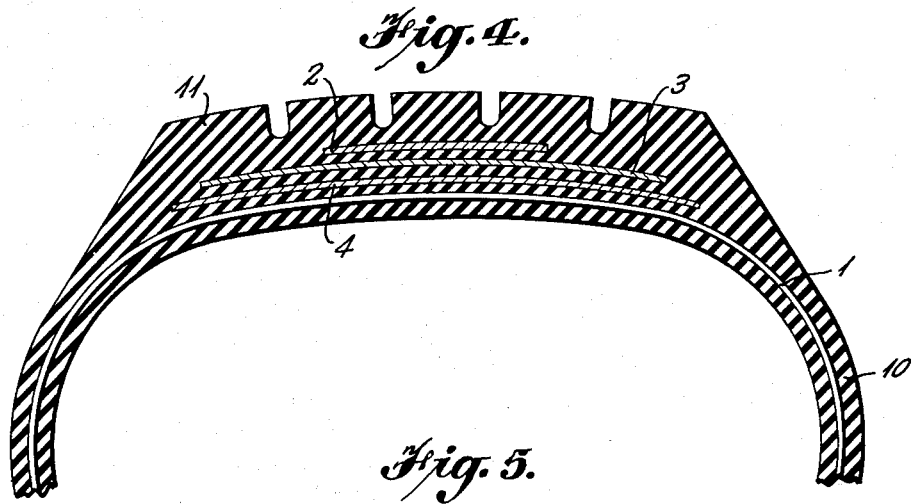
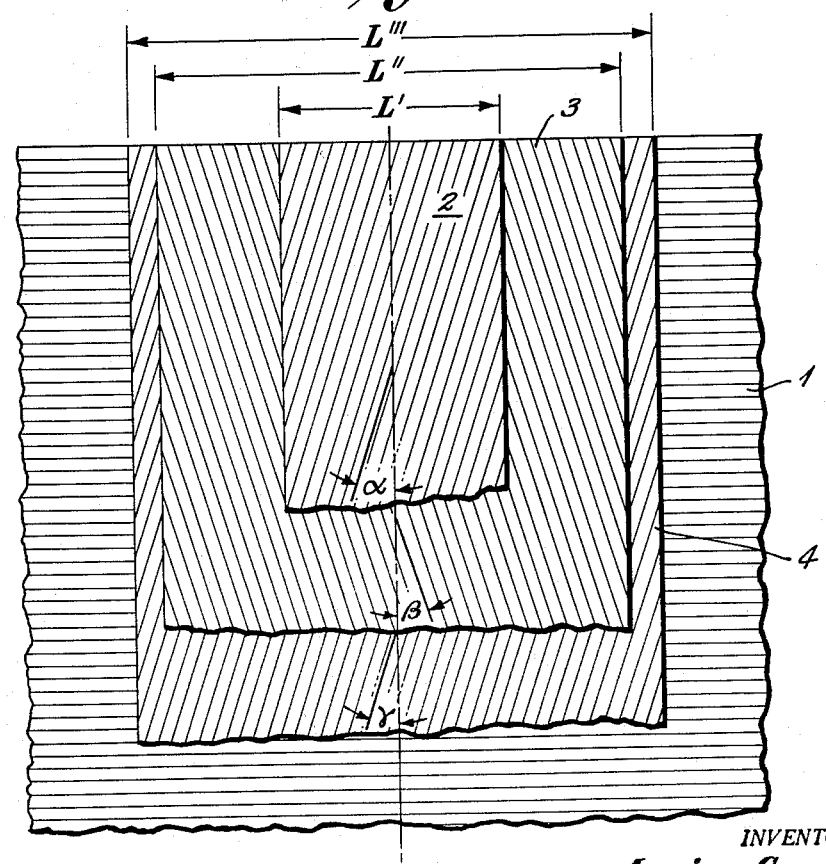

United States Patent Office 3,175,598
Patented Mar. 30, 1965

3,175,598
PNEUMATIC TIRES
Arrigo Cegnar, Milan, Italy, assignor to
Pirelli S.p.A., Milan, Italy
Filed Nov. 29, 1962, Ser. No. 242,042
Claims priority, application Italy, Nov. 10, 1959,
18,635/59, Patent 619,764
6 Claims. (Cl. 152—361)

The present invention relates to pneumatic tires of the type having a breaker structure located between the tread and the carcass and consisting of one or more layers of metallic wires or cords disposed in parallelism in each layer and, with respect to all layers, oriented in at least two directions inclined in respect to the mid-circumferential plane of the tire. More particularly, the present invention relates to a specific improvement in the breaker structure for the purpose of compensating for the transversal forces which tend to deform the tread.

It is known to provide pneumatic tires with a breaker structure which is constituted by one or more pairs of layers in which the wires or cords, hereinafter referred to as "wires," are parallel to one another in each layer and are crossed in each pair at equal and opposite (symmetrical) angles with respect to the mid-circumferential plane of the tire. It is also known to provide pneumatic tires with a breaker structure constituted of three or more layers in which the wires are parallel to one another in each layer and, in all layers, are directed along at least three directions.

In tires provided with a breaker of the above type in which the component wires are metallic or are made of a material having a similar resulting rigidity and where the wires in at least the outermost layer form a small angle, preferably less than 30°, with respect to the mid-circumferential plane of the tire, it has been noted that when such a tire is loaded vertically and rotated on a smooth surface in a direction parallel to its mid-circumferential plane, the tread deforms and a stress having a transversal component tending to displace the tire laterally with respect to its mid-circumferential plane is generated in the direction of the cords in the outermost layer of the breaker.

The effect of the above transversal stress results in a disadvantage from the standpoint of proper steerage of the vehicle and from the standpoint of wear of the tread. The purpose of the present invention is to eliminate undesirable effects caused by the transversal stresses referred to above while, at the same time, retaining the advantages and the desirable performance characteristics of a tire equipped with a breaker of the above general type.

This application is a continuation-in-part of the applicant's co-pending application, Serial No. 67,409, filed November 4, 1960, now abandoned.

In accordance with the basic principle of the present invention, the radially outermost layer of the breaker strip is of a width between ¼ and ½ of the width of the latter. The wires of the radially outermost layer will be inclined in a direction opposite to the wires of the immediately underlying layer. Thus, when the tire is pressed against the ground, the tread is subjected to a deformation in the direction of the outermost layer only in the portion corresponding to the width of this layer, while at the same time, the laterally outermost portions of the tread are subjected to a deformation in the opposite direction as a result of the two lateral portions of the immediately underlying layer which are not covered by the radially outermost layer. The width of the immediately underlying layer is approximately equal to that of the tread. Consequently, the transversal stress generated by the outermost layer is compensated and balanced by the stresses in the opposite direction generated by the lateral portions of the immediately underlying layer.

In accordance with a preferred form of the present invention the breaker structure consists of two layers only, the width of the outer layer being substantially less than that of the inner layer, the wires of the two layers being disposed along symmetrically opposite directions with respect to the mid-circumferential plane of the tire. More specifically, the width of the radially outermost layer must be at least less than ½ and more than ¼ of the width of the inner layer.

If the breaker of the present invention must assume a belting action, i.e., if it must be resistant to tension and essentially inextensible, it could happen in certain instances, for example, when the inflation pressure is high, that the resulting reduction of the width of the outer layer would affect the belting action of the breaker. Therefore, in order to prevent this undesirable effect, a further modification of the invention is provided wherein the wires of the outer layer will be inclined, with respect to the mid-circumferential plane, at an angle smaller than that formed by the wires of the inner layer. Generally, the difference between the inclination of the wires of the two layers will be less than 15°. For example, the wires of the outermost layer can be disposed at an angle of about 10° where the wires of the inner layer are disposed at an angle of 20°.

If the breaker is composed of more than one pair of layers, only the outer layer of the outermost pair need have a width smaller than that of the inner layer of the same pair.

According to a further embodiment of the present invention, the breaker structure consists of three or more layers where the outermost layer is a strip of reduced width which, similar to the above, is smaller than ½ and actually ranges between ¼ and ½ of the width of the immediately underlying layer.

If the breaker is constituted of one or more pairs of layers where the wires of the layers of each pair are oriented symmetrically with respect to the mid-circumferential plane, the wires of the strip of reduced width should, preferably, be oriented symmetrically with the wires of the immediately underlying layer. If, however, the breaker is composed of three or more layers of wires disposed along more than two directions, it is merely necessary that the inclination of the wires in the strip of reduced width be such as to compensate for the transversal stresses indicated above. In any event, the inclination of the wires in this strip should be smaller than 30°.

Therefore, it is a principal object of the present invention to provide a breaker structure of the type described above wherein the adverse effects of the transversal forces acting in the tread region are largely eliminated.

It is a further object of the present invention to provide a breaker structure of the type described above wherein the radially outermost layer has a width considerably smaller than that of the immediately underlying layer.

Other and further objects and advantageous features of the present invention will hereinafter more fully appear in connection with a detailed description of the drawings in which:

FIGURE 4 is a view similar to FIGURE 1 showing, diagrammatically, a further embodiment of the breaker; and FIGURE 5 is a view similar to FIGURE 2 representing the carcass plies and breaker shown in FIGURE 4.

Figure 1:
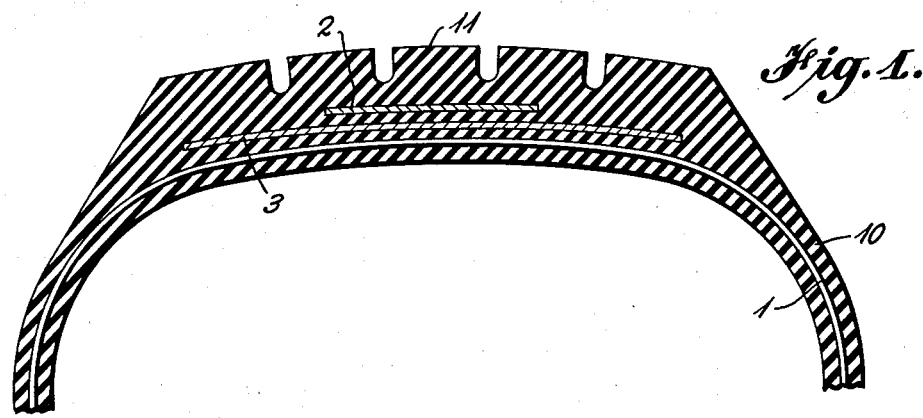
FIGURE 1 is a fragmentary and semi-diagrammatic cross-section of a tire constructed in accordance with the present invention, showing, principally, the relative locations of the various elements in the tire.
Figure 2:
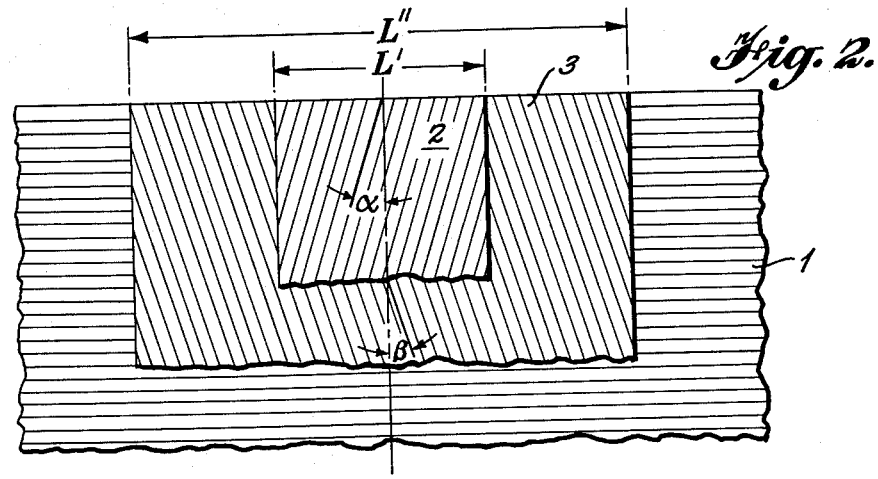
FIGURE 2 is a fragmentary plan view, developed in plane, showing the carcass plies and one embodiment of the breaker illustrated in FIGURE 1.

Referring to the drawings in detail, FIGURE 1 shows a tire carcass 10 of the radial type having radial plies 1. The tread portion of the tire is designated by the numeral 11. Between the tread portion and the carcass plies there is located a breaker formed of an outer layer 2 and an inner layer 3. As shown in FIGURE 2, the outer layer 2 has a width L' and the inner layer 3 has a width L", the width L" being about 40% of the width L'.

The wires of the layers 2 and 3 are disposed at angles $\alpha$ and $\beta$, respectively, with respect to the mid-circumferential plane of the tire. In the case of FIGURE 2 $\alpha$ and $\beta$ are equal and represent a value of about 18°.

Figure 3:
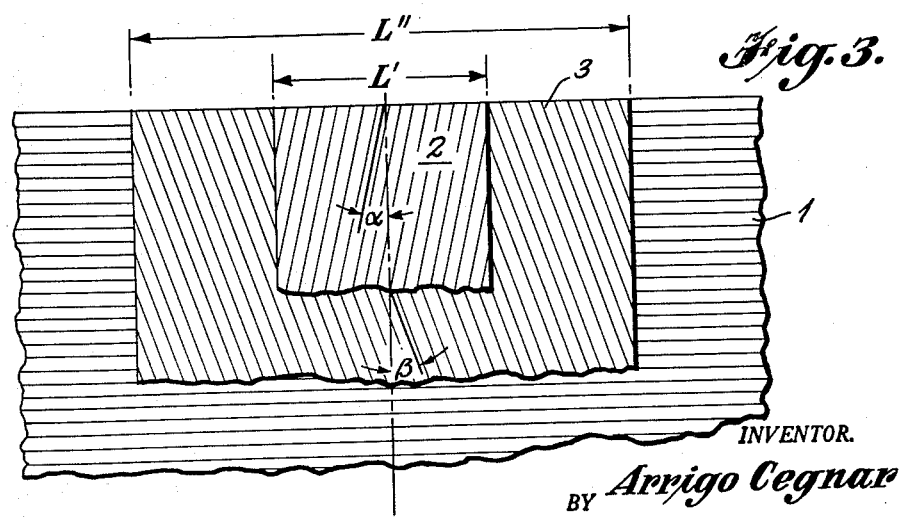
FIGURE 3 is a view similar to FIGURE 2 showing another embodiment of the breaker of FIGURE 1.

FIGURE 3 represents a breaker which is designed to carry out a belting action; i.e., it is resistant to tension and substantially inextensible. In this instance, however, the angle $\alpha$ must be somewhat smaller, because otherwise the reduction of the width of the outer layer would affect the belting action of the breaker. Therefore, in FIGURE 3, the angle $\alpha$ is 10° while the angle $\beta$ is 20°.

FIGURES 4 and 5 relate to a further embodiment of the invention and show a conventional breaker consisting of two layers 3 and 4 on which a further layer 2 of reduced width is superimposed.

The layer 3 has a width L" and the layer 4 has a width L'", the width L'" being 10% greater than the width L".

The additional layer 2 has a width L' which is about 40% of the width of the layer 3.

The wires of layers 3 and 4 form angles $\beta$ and $\gamma$, respectively, equal and symmetrical with respect to the mid-circumferential plane of the tire. These angles $\beta$ and $\gamma$ have a value of 18°.

The wires of layer 2 are inclined with respect to the mid-circumferential plane of the tire at an angle $\alpha$ equal and symmetrical to the angle $\beta$. Therefore, the wires of layer 2 are parallel to the wires of layer 4.

In the above described embodiments, it should be noted that the width of the radially outermost layer, or strip, of the breaker structure is always considerably less than that of the immediately underlying layer ranging between ¼ and ½ of the width of the underlying layer. The wires in the radially outermost layer are always disposed in a direction which is crossed with respect to those in the underlying layer. Thus, in the portion of the tread superimposed above the radially outermost strip the transverse stresses will tend to act in a certain direction; at the same time, in the laterally outermost portions of the tread overlying the lateral portions of the underlying layer (which are not covered by the outermost strip), the transversal forces will be exerted in a direction opposite to the above. The overall effect is to compensate and balance the various transversal stresses created.

Whereas, the present invention has been described in particular relation to the various embodiments illustrated herein, it should be apparent that other and further embodiments apart from those shown or suggested herein might be made within the spirit and scope of this invention.

What is claimed is:

1. A pneumatic tire of the type having a carcass, a tread, and a breaker structure, said breaker structure comprising at least two radially spaced layers of wires parallel to one another in each layer and directed along at least two directions inclined with respect to the mid-circumferential plane of the tire, said mid-circumferential plane passing through the longitudinal center of each of said layers, the improvement wherein the radially outermost of said layers is of a width less than ½ but more than ¼ of the width of the immediately underlying layer, and said wires of said outermost layer being inclined, relative to said mid-circumferential plane, in a direction opposite to the wires of said immediately underlying layer.

2. A pneumatic tire as defined by claim 1, wherein the width of said immediately underlying layer is approximately the same as the width of said tread.

3. A pneumatic tire as set forth in claim 1, characterized in that the wires of said outermost layer are inclined in an opposite direction, and at a small angle, with respect to the wires of said immediately underlying layer.

4. A pneumatic tire as defined in claim 3, characterized in that the difference between angles formed by the wires of said radially outermost layer and by the wires of said immediately underlying layer with the mid-circumferential plane is less than 15°.

5. A pneumatic tire as defined by claim 1, in which the breaker comprises at least three layers of wires parallel to one another in each layer and directed along at least three directions, characterized in that said outermost layer is constituted of wires inclined in a direction opposite to that of the wires of said immediately underlying layer at an angle less than 30° and commensurate with the transversal stress to be eliminated.

6. A pneumatic tire as defined by claim 1, wherein said wires of said radially outermost layer are at an equal and symmetrical angle with respect to the wires of said immediately underlying layer.

References Cited in the file of this patent

UNITED STATES PATENTS

| 2,943,663 | Antonson | July 5, 1960 |
| 2,958,359 | Boussu et al. | Nov. 1, 1960 |
| 3,058,509 | Maiocchi | Oct. 16, 1962 |

FOREIGN PATENTS

| 1,018,240 | France | Oct. 8, 1952 |
| 1,214,031 | France | Nov. 2, 1959 |